United States Patent
Bonaventure et al.

(10) Patent No.: US 7,478,379 B2
(45) Date of Patent: Jan. 13, 2009

(54) METHOD FOR MINIMIZING SPILL IN CODE SCHEDULED BY A LIST SCHEDULER

(75) Inventors: Damien Bonaventure, Toronto (CA); James Lawrence McInnes, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 654 days.

(21) Appl. No.: 10/840,088

(22) Filed: May 6, 2004

(65) Prior Publication Data

US 2005/0022191 A1 Jan. 27, 2005

(30) Foreign Application Priority Data

May 7, 2003 (CA) .................................. 2428284

(51) Int. Cl.
G06F 9/44 (2006.01)
G06F 9/48 (2006.01)
G06F 9/40 (2006.01)

(52) U.S. Cl. .................. 717/161; 718/102; 712/218

(58) Field of Classification Search ............... 717/140, 717/150, 160

See application file for complete search history.

(56) References Cited

U.S. PATENT DOCUMENTS

| | | | |
|---|---|---|---|
| 5,819,088 A | 10/1998 | Reinders | 395/672 |
| 6,212,512 B1 | 4/2001 | Barney et al. | 707/1 |
| 6,260,190 B1 | 7/2001 | Ju | 717/7 |
| 6,341,370 B1 * | 1/2002 | Tirumalai et al. | 717/141 |
| 6,625,807 B1 * | 9/2003 | Chen | 717/154 |
| 6,826,748 B1 * | 11/2004 | Hohensee et al. | 717/130 |
| 7,127,592 B2 * | 10/2006 | Abraham et al. | 712/217 |
| 7,269,827 B2 * | 9/2007 | Metzger | 717/151 |
| 2003/0237080 A1 * | 12/2003 | Thompson et al. | 717/161 |
| 2005/0022191 A1 * | 1/2005 | Bonaventure et al. | 718/100 |
| 2005/0055490 A1 * | 3/2005 | Widell et al. | 711/1 |

OTHER PUBLICATIONS

Cheng, W. et al. "Code Generation of Nested Loops for DSP Processors with Heterogeneous Registers and Structural Pipelining" ACM Transactions on Design Automation of Electronic Systems, vol. 4, No. 3, Jul. 1999, pp. 231-256.

Eichenberger, A. et al. "Optimum Modulo Schedules for Minimum Register Requirements", ACM 0-89791-726/6/95/0007, pp. 31-40, 1995.

(Continued)

*Primary Examiner*—Tuan Q Dam
*Assistant Examiner*—Isaac T Tecklu
(74) *Attorney, Agent, or Firm*—Hamilton & Terrile, LLP; Stephen A. Terrile

(57) ABSTRACT

A technique of ordering machine instructions to reduce spill code. For each machine instruction that is ready for scheduling, an amount is determined by which the size of a committed set of machine instructions would increase upon the scheduling of the machine instruction. The machine instruction for which the determined amount is smallest is then scheduled. The currently committed instructions may be determined to be the machine instructions that are already scheduled as well as the machine instructions that are descendent from already scheduled machine instructions. The result is that new computations upon which a target processor will embark tend to be deferred. Bit vectors may be employed for efficiency during the assessment of candidate instructions that are ready for scheduling. The technique may be triggered when the risk of registers becoming overcommitted becomes high, as may occur when the number of available processor registers drops below a certain threshold.

1 Claim, 2 Drawing Sheets

OTHER PUBLICATIONS

Chekuni, C. et al. "Profile-Driven Instruction Level Parallel Scheduling with Application to Super Blocks", IEEE, 1072-4451, 1996.

Shieh, J. J. et al. "On Reordering Instruction Streams for Pipelined Computers", 22nd Annual International Workshop on Microprogramming and Microarchitecture, Aug. 1989.

Shieh, J. J. et al. "Fine Grain Mapping Strategy For Multiprocessor Systems", IEEE Proceedings, vol. 138, No. 3, May, 1991.

Kim, B. M. et al. "Resource Allocation and Code Generation For Pointer Based Pipelined DSP Multiprocessors", IEEE, 1990.

Aizikovitz, NE. et al. "Limiting Lifetimes of Register Sequences to Improve Register Allocation" TDB, vol. 38, No. 11, pp. 89-92.

* cited by examiner

METHOD FOR MINIMIZING SPILL IN CODE SCHEDULED BY A LIST SCHEDULER

BACKGROUND OF THE INVENTION

1. Field of the Invention

The present invention relates to compilers, and more particularly to list schedulers used in association with compilers.

2. Description of the Related Art

When computer program source code is compiled, the result is a list of machine instructions capable of execution by a target processor. The program which converts source code to machine instructions is referred to as a compiler.

Most compilers incorporate a list scheduler. A list scheduler orders machine instructions in an attempt to improve the efficiency of their execution. The efficiency of a particular ordering of machine instructions is typically measured by the amount of time required for a target processor to execute the machine instructions. The list scheduler typically reorders an interim ordering of instructions that is generated during a first pass of the compilation process.

The behaviour of a list scheduler is governed by one or more heuristics. A heuristic is a particular method of ordering machine instructions. An example of a commonly used heuristic is the Critical Path Heuristic. Heuristics may be applied by a list scheduler individually or in combination.

When a set of machine instructions which has been ordered using known heuristics is executed, the registers of the target processor can become overcommitted. A processor's registers are said to become overcommitted when a machine instruction calls for the use of a register, but all of the processor's registers are already in use. In this situation, "spill code" is typically generated which causes one or more registers to be vacated, so that program execution may proceed. Vacating a register typically entails storage of its contents to volatile memory and, after the register has been used for the execution of a machine instruction, restoration of its previous contents from volatile memory. Spill code tends to degrade efficiency, as each volatile memory access can waste a significant number of clock cycles. This is especially true in respect of modern processors whose speeds may be significantly faster than the speeds associated with volatile memory.

Accordingly, a need exists for a heuristic which addresses the above noted difficulty in the prior art.

SUMMARY OF THE INVENTION

A method of ordering machine instructions to reduce spill code involves, for each machine instruction that is ready for scheduling, determining an amount by which the size of a committed set of machine instructions would increase upon the scheduling of the machine instruction; and scheduling the machine instruction for which the determined amount is smallest. The currently committed instructions may be determined to be the machine instructions that are already scheduled as well as the machine instructions that are descendent from already scheduled machine instructions. The result is that new computations upon which a target processor will embark tend to be deferred. Bit vectors may be employed for efficiency during the assessment of candidate instructions that are ready for scheduling. The method may be triggered when the risk of registers becoming overcommitted becomes high, as may occur when the number of available processor registers drops below a certain threshold.

In accordance with an aspect of the present invention there is provided a method of determining an execution order for machine instructions to reduce spill code, comprising: from machine instructions that are ready for scheduling, scheduling the machine instruction for which an amount by which the size of a committed set of machine instructions would increase upon the scheduling of said machine instruction is smallest.

In accordance with another aspect of the present invention there may be provided a computer program product having media including computer programmed instructions for directing a computing device to implement the above method.

In accordance with another aspect of the present invention there may be provided a computing device comprising a processor and persistent storage memory in communication with said processor storing processor readable instructions for directing said device to undertake the above method.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate an example embodiment of this invention.

DESCRIPTION OF THE PREFERRED EMBODIMENT

Figure 1:
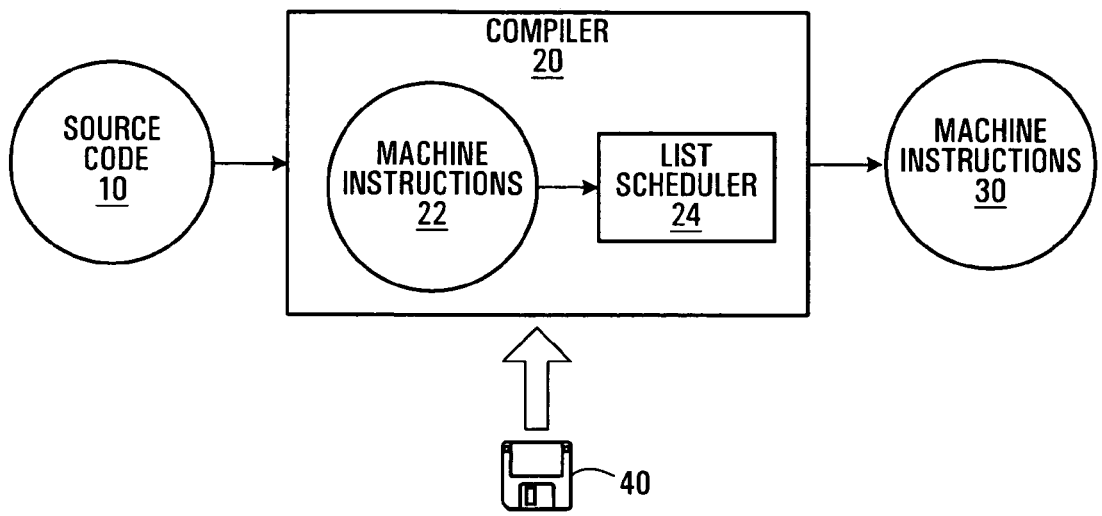
FIG. 1 is a schematic diagram illustrating a compiler and list scheduler exemplary of the present invention.

Referring to FIG. 1, a compiler 20 for compiling computer program source code 10 is illustrated. Compiler 20 incorporates a list scheduler 24 exemplary of an embodiment of the present invention. Compiler 20 and list scheduler 24 may be loaded for execution by a computing device (not illustrated), such as a PC, from a computer readable medium, such as a removable magnetic or optical disk 40. The computing device has a target processor, such as an Intel® Pentium® 4 processor, with which the compiler 20 is compatible, as well as volatile memory (also not illustrated). The processor has a set of registers.

The compiler 20 accepts source code 10 to be compiled. The source code 10 may be written in a higher level programming language such as C. In the present embodiment, source code 10 contains the following three instructions:

```
Do i = 1 to n
    A[i] = A[i] + B[i]
    C[i] = D[i] + E[i]
```

The compiler 20 generates an interim set of machine instructions 22 from source code 10 in a first pass of the compilation process. The machine instructions 22 that are generated from the above-noted higher level language instructions are set out below:

(1) LD r1=A[i]
(2) LD r2=B[i]
(3) LD r4=D[i]
(4) LD r5=E[i]
(5) ADD r3=r1+r2

(6) ST A[i]=r3
(7) ADD r6=r4+r5
(8) ST C[i]=r6
(9) BRANCH (1) (if counter>0)

In the machine instructions 22, the labels (1) to (9) are understood not to be part of the instructions, but rather have been applied to facilitate reference to individual machine instructions in the present description. LD is a load instruction used to load a register with a value from volatile memory, ADD is an add instruction used to add together two register values, and ST is a store instruction used to store a register value to a volatile memory location. It is understood that the store at (8) increments i and the branch decrements a loop counter.

Certain dependencies inhere in the machine instructions (1) to (9) from the use of common processor registers. For example, machine instruction (5) is dependent on machine instructions (1) and (2) because machine instruction (5) may not add together the values of registers r1 and r2 with a correct result until these registers have been loaded by machine instructions (1) and (2) (respectively).

Figure 2:
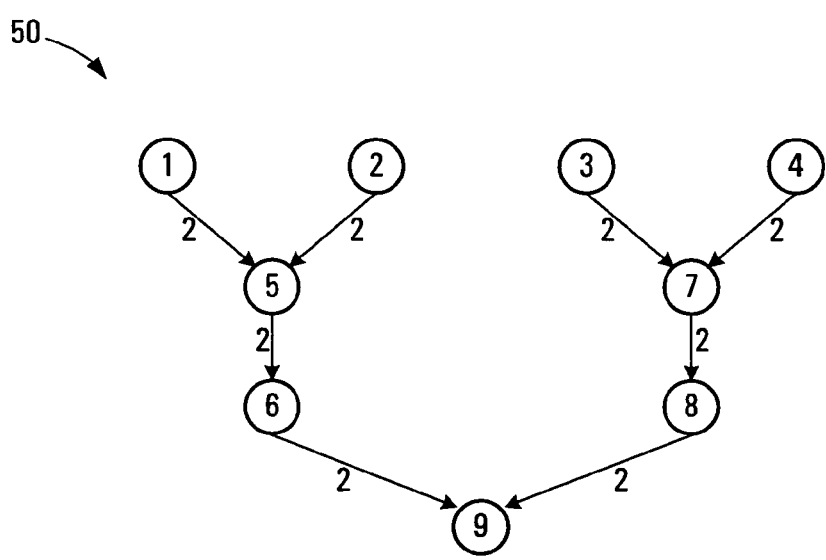
FIG. 2 is a data dependence graph (DDG) illustrating dependencies between machine instructions shown in FIG. 1.

FIG. 2 illustrates the dependencies between machine instructions (1) to (9) in the form of a data dependence graph (DDG) 50. Each machine instruction (1) to (9) is represented by a node in the DDG 50. Directed edges (i.e. arrows) between nodes denote dependencies (i.e. ordering constraints) between machine instructions: a machine instruction at the head of an arrow may not be executed with a correct programmatic result until the machine instruction at the tail of the arrow has completed. The machine instruction at the head of an arrow is said to be "dependent" on the machine instruction at the tail of an arrow. The machine instructions along a path of directed edges originating from a machine instruction are referred to as "descendants" of that machine instruction. For certainty, it is noted that a machine instruction may have descendent machine instructions regardless of whether or not a DDG has been created.

Each directed edge has associated with it a hardware delay measured in a number of hardware cycles required for the instruction at the tail of the arrow to complete on the target processor. In the DDG 50, the delay associated with each directed edge is 2 cycles.

Referring again to FIG. 1, the interim set of machine instructions 22 is passed to the list scheduler 24. The purpose of list scheduler 24 is to reorder machine instructions 22 in an attempt to improve the efficiency of their execution. The list scheduler 24 applies a heuristic to the instructions 22 in accordance with an embodiment of the present invention in furtherance of this goal. A reordered set of machine instructions 30 results.

In overview, application of the heuristic entails an iterative sequence of: evaluating which machine instructions are presently committed (i.e. which instructions descend from instructions which have already been reordered, that is, scheduled for execution); evaluating which machine instructions would be committed if each of the machine instructions that is ready for scheduling were to be scheduled as the next machine instruction; and scheduling as the next machine instruction the machine instruction which results in the smallest increase in the number of committed machine instructions. This approach effectively defers new computations upon which the target processor embarks, and thus tends to minimize the demand for registers at any given time.

Figure 3:
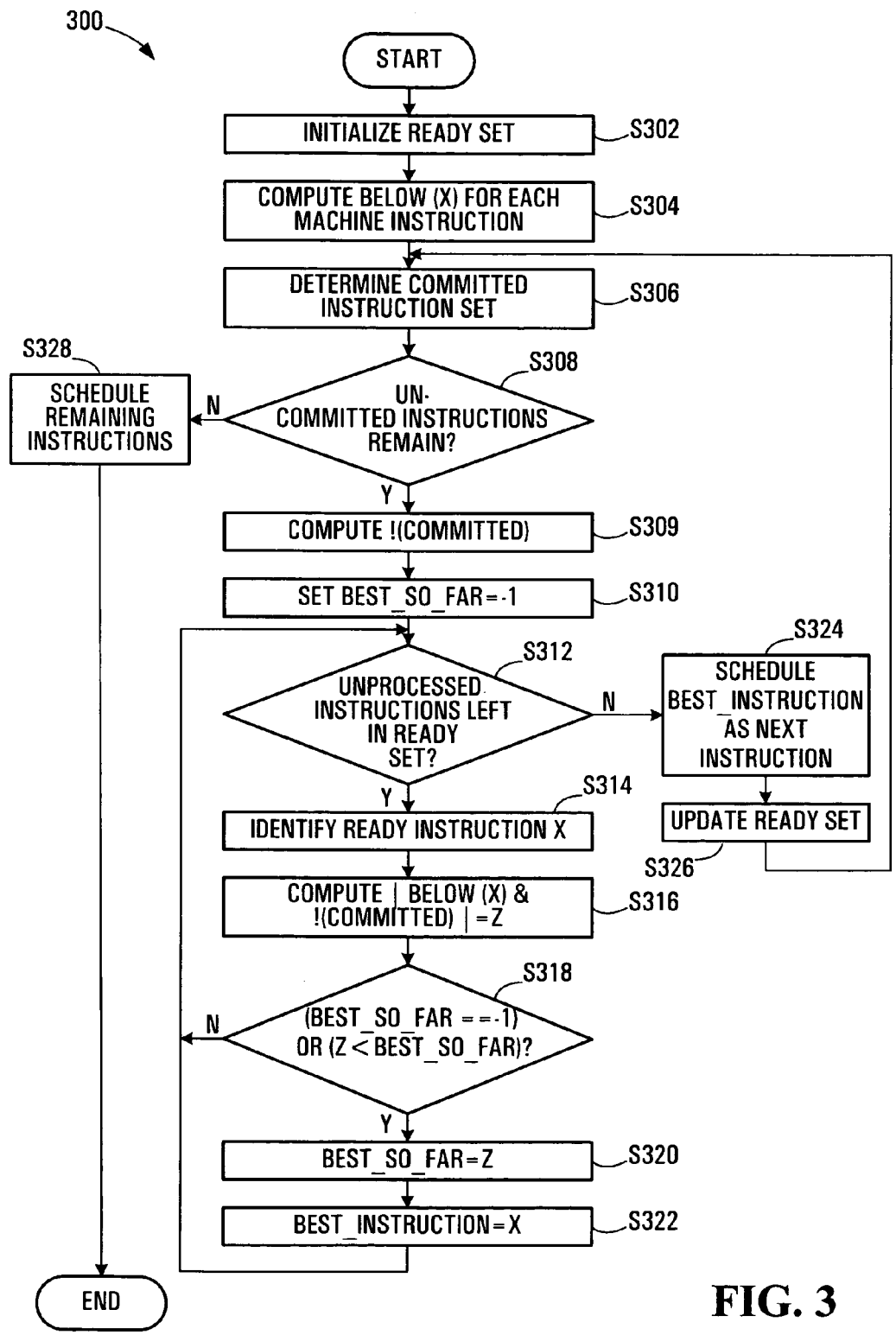
FIG. 3 is a flowchart illustrating operation of the list scheduler of FIG. 1.

Operation 300 of the heuristic is illustrated in FIG. 3. The objective of the operation 300 is to reorder the set of machine instructions 22 into a new, more efficient execution order in machine instructions 30. The set of machine instructions 30 may initially be viewed as an empty list having as many empty machine instruction slots to be filled as there are machine instructions to be reordered (i.e., nine):

(1') _____
(2') _____
(3') _____
(4') _____
(5') _____
(6') _____
(7') _____
(8') _____
(9') _____

The reordered instructions are labeled (1') to (9') above to distinguish them from the labels (1) to (9) used for machine instructions 22.

A "Ready set" of instructions ready for scheduling but as yet unscheduled is initially determined (S302). An instruction is deemed ready for scheduling if it can be scheduled as the next instruction in machine instructions 30 without resulting causing the executable program code to be incorrect (e.g. as would be the case if an ADD instruction were to be scheduled ahead of a LD instruction which loads a register to be added). This definition of "ready" should be distinguished from "data ready", which describes an instruction that is ready for scheduling because it is not dependent on any other instruction that has not completed.

In the present example, the Ready set initially contains machine instructions (1) to (4):

Ready={1,2,3,4}

Next, for each machine instruction X of the instructions (1) to (9) to be scheduled, a function Below(X) is computed and the result stored (S304). Below(X) is a function which identifies X and X's descendants. The Below(X) values will be used during the reordering process during assessment of candidate instructions for scheduling. The Below(X) values are each stored as a bit vector with one bit for each instruction to be reordered. The use of such bit vectors during operation 300 is for the purpose of limiting computational cost. The ordinal position of each bit indicates the number of the represented machine instruction. A bit which has been set ("1") indicates inclusion within a set while a bit which has been reset ("0") indicates exclusion from the set:

Below(1)={1,5,6,9} or 100011001
Below(2)={2,5,6,9} or 010011001
Below(3)={3,7,8,9} or 001000111
Below(4)={4,7,8,9} or 000100111
Below(5)={5,6,9} or 000011001
Below(6)={6,9} or 000001001
Below(7)={7,8,9} or 000000111
Below(8)={8,9} or 000000011
Below(9)={9} or 000000001

Subsequently, a set of committed instructions (the "Committed" set) is determined (S306). The Committed set includes all machine instructions that have been scheduled (i.e., reordered into a "slot" in machine instructions 30) as well as all machine instructions descendent from instructions that have been scheduled. The Committed set is represented as a bit vector similar to the Below(X) bit vectors. The Committed set is determined by computing Below(Y) for each instruction Y that the list scheduler has already scheduled and taking a bitwise OR (e.g. as represented by a single vertical bar) of these values. At the present stage, the Committed set is empty as no instructions have yet been scheduled:

Committed={ } or 000000000

Accordingly, operation at S308 determines that uncommitted machine instructions do in fact remain.

Next, the bitwise complement of the Committed bit vector is taken (S309). This value is stored for later use during assessment of machine instructions for scheduling:

!Committed=111111111

A variable BEST_SO_FAR is then initialized to −1 (S310). The BEST_SO_FAR variable will be used to identify the machine instruction that is the best candidate for scheduling into the next open slot of machine instructions 30.

As all of the instructions of the Ready set are as yet unprocessed (S312), machine instruction (1) is identified as the next ready instruction (S314).

A bitwise AND is computed between the previously computed values of Below(1) and !(Committed), and a population count of the resultant bit vector is taken and assigned to a temporary variable Z (S316). A population count operator, represented by a pair of vertical bars, counts the number of "1s" in a bit vector:

$$Z = |\text{Below (1) \& !(Committed)}|$$
$$= |100011001 \text{ \& } 111111111|$$
$$= |100011001|$$
$$= 4$$

Z represents the number of previously uncommitted instructions which would become committed if machine instruction (1) were to be scheduled into slot (1').

Because BEST_SO_FAR still has its initial value of −1 (S318), it is set to the Z value of 4 (S320). A BEST_INSTRUCTION variable representative of the best candidate for scheduling into the next available slot (1') is set to indicate machine instruction (1) (S322).

The operation of S312-S322 is repeated for each remaining machine instruction (2), (3), and (4) of the Ready set. In the result, the BEST_SO_FAR value is left with a value of 4 and the BEST_INSTRUCTION VALUE remains (1), because none of the other ready machine instructions (2), (3) or (4) would result a smaller increase than 4 in the number of members of the Committed set. Actually, because all four instructions (1) to (4) would increase the Committed set by four, they are all equally good candidates for scheduling into slot (1'). In the result, machine instruction (1) is scheduled into slot (1') machine instructions 30 (S324):

(1') LD r1=A[i]
(2') _____
(3') _____
(4') _____
(5') _____
(6') _____
(7') _____
(8') _____
(9') _____

The Ready set is updated to remove instruction (1) to reflect this scheduling (S326).

Ready={2,3,4}

It is noted that instruction (5) is not added to the Ready set, as an incorrect programmatic result would occur if instruction (5) were to be scheduled ahead of instruction (2), which is as yet unscheduled.

Operation continues (S306, S308, S309) with the following computations:

Committed=Below(1)={1,5,6,9} or 100011001
!Committed=011100110

Three passes through operation S312 to S322 (one for each of instruction (2) to (4) of the Ready set) yields the following computations:

if (2) were to be scheduled next:

$$\text{Committed would} = \text{Below (1) | Below (2)}$$
$$= \{1, 5, 6, 9\} | \{2, 5, 6, 9\}$$
$$= \{1, 2, 5, 6, 9\}$$

representing an increase Z=1, computed as follows:

$$Z = |\text{Below (2) \& !(Committed)}|$$
$$= |010011001 \text{ \& } 011100110|$$
$$= |010000000|$$
$$= 1$$

if (3) were to be scheduled next:

$$\text{Committed would} = \text{Below (1) | Below (3)}$$
$$= \{1, 5, 6, 9\} | \{3, 7, 8, 9\}$$
$$= \{1, 3, 5, 6, 7, 8, 9\}$$

representing an increase Z=3, computed as follows:

$$Z = |\text{Below (3) \& !(Committed)}|$$
$$= |001000111 \text{ \& } 011100110|$$
$$= |001000110|$$
$$= 3$$

if (4) were to be scheduled next:

$$\text{Committed would} = \text{Below (1) | Below (4)}$$
$$= \{1, 5, 6, 9\} | \{4, 7, 8, 9\}$$
$$= \{1, 4, 5, 6, 7, 8, 9\}$$

representing an increase Z=3, computed as follows:

$$Z = |\text{Below (4) \& !(Committed)}|$$
$$= |000100111 \text{ \& } 011100110|$$
$$= |000100110|$$
$$= 3$$

Z=smallest if (2) is scheduled

Conclusion: schedule (2)

Thus, machine instructions (2) is scheduled in slot (2') of machine instructions 30 (S324), as it results in the smallest increase in the Committed set:

(1') LD r1=A[i]
(2') LD r2=B[i]
(3') _____
(4') _____
(5') _____
(6') _____
(7') _____
(8') _____
(9') _____

The Ready set is updated to remove instruction (2) and to add instruction (5), which may now feasibly be scheduled without causing an incorrect programmatic result (S326):
Ready={3,4,5}
Operation continues at S308 to S324 with the following computations and conclusion (bit vector calculations are omitted for brevity):
Committed={1,2,5,6,9}
if (3) were to be scheduled next:
Committed would={1,2,3,5,6,7,8,9}
representing an increase Z=3
if (4) were to be scheduled next:
Committed would={1,2,4,5,6,7,8,9}
representing an increase Z=3
if (5) were to be scheduled next:
Committed would={1,2,5,6,9}
representing an increase Z=0 (smallest)
Conclusion: schedule (5)
The Ready set is updated (S316):
Ready={3,4,6}
Subsequently, it is determined that the Committed set will stay the same (S306, S308, S309):
Committed={1,2,5,6,9}
Operation at S310 to S324 results in the scheduling of instruction (6) next, for similar reasons to the scheduling of (5). The set of scheduled machine instructions 30 is thus now:
(1') LD r1=A[i]
(2') LD r2=B[i]
(3') ADD r3=r1+r2
(4') ST A[i]=r3
(5') _____
(6') _____
(7') _____
(8') _____
(9') _____
and the Ready set is left with only two instructions:
Ready={3,4}
Operation continues at S306 to S324 with the following conclusion:
Committed={1,2,5,6,9}
if (3) were to be scheduled next:
Committed would={1,2,3,5,6,7,8,9}
representing an increase Z=3
if (4) were to be scheduled next:
Committed would={1,2,4,5,6,7,8,9}
representing an increase Z=3
i.e. the two instructions are equally good candidates
Conclusion: schedule (3)
Updating of the Ready set (S316) leaves only one instruction:
Ready={4}
Thus machine instruction (4) is therefore scheduled next.
In the subsequent operation, it is determined that no uncommitted instructions remain (S308) and that all instructions remaining to be scheduled would therefore increase the Committed set by the same amount (i.e., zero). As a result, the remaining unscheduled instructions (7), (8), and (9) may be scheduled in any manner that does not produce an incorrect programmatic result (S328). The final reordered set of machine instructions 30 is thus:
(1') LD r1=A[i]
(2') LD r2=B[i]
(3') ADD r3=r1+r2
(4') ST A[i]=r3
(5') LD r4=D[i]
(6') LD r5=E[i]
(7') ADD r6=r4+r5
(8') ST C[i]=r6
(9') Branch (1)

Operation 300 is thus concluded.

It is noted that operation 300 may be triggered by the list scheduler 24 only when the risk of registers becoming overcommitted becomes high. This may be the case when the number of available registers drops below a certain threshold, e.g., as may be assessed by counting the number of extant live ranges (i.e., the number of registers presently in use over some range of instructions). In such cases, an alternative heuristic may be employed prior to the triggering of the present heuristic.

It is noted that machine instructions 30 may in some cases turn out to have the same order as machine instructions 22 where no efficiency gains can be realized through application of the heuristic.

As will be appreciated by those skilled in the art, modifications to the above-described embodiment can be made without departing from the essence of the invention. For example, the use of bit vectors by the list scheduler is optional, although typically advantageous for increasing the efficiency of operation 300, especially when the set of machine instructions 22 to be reordered is large.

In another alternative, the function Below(X) employed during operation 300 may include only the descendents of instruction X and not instruction X itself as described above. In this case the Committed set might instead be referred to as the "ToBeCommitted" set as it would not include instructions that have already been scheduled. Such an embodiment would operate similarly to the above-described embodiment, except that the computed Z values would all be reduced by 1. The ultimate scheduling of machine instructions 30 would be the same.

For instance, in an exemplary second pass through operation S306 to S324 in such an alternative embodiment, the following calculations would occur:
ToBeCommitted=Below(1)={5,6,9} or 000011001
!ToBeCommitted=111100110

Three passes through operation S312 to S322 (one for each of instruction (2) to (4) of the Ready set) would yield the following computations:
if (2) were to be scheduled next:

$$\begin{aligned} ToBeCommitted \text{ would} &= Below\,(1)\,|\,Below\,(2) \\ &= \{5, 6, 9\}\,|\,\{5, 6, 9\} \\ &= \{5, 6, 9\} \end{aligned}$$

representing an increase Z=0,
computed as follows:

$$\begin{aligned} Z &= |Below\,(2)\ \&\ !(ToBeCommitted)| \\ &= |000011001\ \&\ 111100110| \\ &= |000000000| \\ &= 0 \end{aligned}$$

if (3) were to be scheduled next:

$$\begin{aligned} ToBeCommitted \text{ would} &= Below\,(1)\,|\,Below\,(3) \\ &= \{5, 6, 9\}\,|\,\{7, 8, 9\} \\ &= \{5, 6, 7, 8, 9\} \end{aligned}$$

representing an increase Z=2,
computed as follows:

$$Z = |\text{Below (3) \&!}(ToBeCommitted)|$$
$$= |000000111 \,\&\, 111100110|$$
$$= |000000110|$$
$$= 2$$

if (4) were to be scheduled next:

$$ToBeCommitted \text{ would} = \text{Below (1)}|\text{Below (4)}$$
$$= \{5, 6, 9\}|\{7, 8, 9\}$$
$$= \{5, 6, 7, 8, 9\}$$

representing an increase Z=2,
computed as follows:

$$Z = |\text{Below (4) \&!}(ToBeCommitted)|$$
$$= |000000111 \,\&\, 111100110|$$
$$= |000000110|$$
$$= 2$$

Z=smallest if (2) is scheduled
Conclusion: schedule (2)

Thus, the same conclusion as was reached in this pass of the first-described embodiment, i.e., that machine instruction (2) should be scheduled next, is reached in this embodiment.

For clarity, it is noted that the terminal condition evaluated in S308 of such an alternative embodiment would need to assess whether uncommitted and unscheduled instructions remain, rather than just whether uncommitted instructions remain.

Other modifications will be apparent to those skilled in the art and, therefore, the invention is defined in the claims.

What is claimed is:

1. A method of determining an execution order for machine instructions to reduce spill code, said method comprising the step of:

from machine instructions that are ready for scheduling, scheduling the machine instructions for which an amount by which a size of a committed set of instructions would increase upon the scheduling of said machine instruction is smallest relative to the amount by which the size of the committed set of machine instructions for machine instructions ready for scheduling would increase upon scheduling of all said machine instructions, said committed set of machine instructions including any machine instruction that is already scheduled and any machine instruction that is descendent from an already scheduled machine instruction, for each of said machine instructions ready for scheduling, said amount being determined by identifying descendent machine instructions of each of said machine instructions; and determining which of said descendent machine instructions and said machine instructions is not in said committed set of machine instructions;

determining an execution order for the machine instructions to reduce spill code, a given machine instruction being considered ready for scheduling when scheduling of said given machine instruction as a next machine instruction would not cause an erroneous programmatic result; and, undertaking the method when a risk of registers becoming overcommitted exceeds a certain threshold, said threshold being exceeded when processor register availability drops below a particular threshold as determined based upon a number of registers in use.

* * * * *